United States Patent
Jung et al.

(10) Patent No.: US 9,952,467 B2
(45) Date of Patent: Apr. 24, 2018

(54) PHOTO-ALIGNMENT LAYER AND LIQUID CRYSTAL DISPLAY INCLUDING THE SAME

(71) Applicant: Samsung Display Co., Ltd., Yongin-si (KR)

(72) Inventors: Jin-Soo Jung, Hwaseong-si (KR); Suk Hoon Kang, Seoul (KR); Jong Hwan Jeon, Hwaseong-si (KR); In Ok Kim, Osan-si (KR); Jun Woo Lee, Seongnam-si (KR); Baek Kyun Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 45 days.

(21) Appl. No.: 15/006,760

(22) Filed: Jan. 26, 2016

(65) Prior Publication Data

US 2016/0266441 A1 Sep. 15, 2016

(30) Foreign Application Priority Data

Mar. 10, 2015 (KR) .................. 10-2015-0033309

(51) Int. Cl.
*C09K 19/00* (2006.01)
*G02F 1/1337* (2006.01)
(Continued)

(52) U.S. Cl.
CPC ...... *G02F 1/133723* (2013.01); *G02F 1/1368* (2013.01); *G02F 1/13439* (2013.01);
(Continued)

(58) Field of Classification Search
CPC ........... G02F 1/133723; G02F 1/13378; G02F 1/133788; G02F 1/133711;
(Continued)

(56) References Cited

U.S. PATENT DOCUMENTS

| 6,063,829 A | 5/2000 | Endou et al. |
| 2011/0222005 A1 | 9/2011 | Mizusaki et al. |

(Continued)

FOREIGN PATENT DOCUMENTS

| JP | 10310608 A | * 11/1998 |
| JP | 2008116809 | 5/2008 |

(Continued)

OTHER PUBLICATIONS

Extended European Search Report dated Jul. 27, 2016, of European Patent Application No. 16159108.6.

(Continued)

*Primary Examiner* — Ruiyun Zhang
(74) *Attorney, Agent, or Firm* — H.C. Park & Associates, PLC

(57) ABSTRACT

A liquid crystal display is provided. A photo-alignment layer thereof includes a polyimide and a crosslinker including an alkylene group ($-C_nH_{2n}-$, where n is a natural number) and a plurality of crosslinking end groups, wherein the plurality of crosslinking end groups include at least two types of end groups or end group derivatives, each type having a different available functional group.

23 Claims, 11 Drawing Sheets

(51) Int. Cl.
*G02F 1/1333* (2006.01)
*G02F 1/1343* (2006.01)
*G02F 1/1362* (2006.01)
*G02F 1/1368* (2006.01)

(52) U.S. Cl.
CPC .. *G02F 1/133345* (2013.01); *G02F 1/133788* (2013.01); *G02F 1/134309* (2013.01); *G02F 1/136227* (2013.01); *Y10T 428/10* (2015.01); *Y10T 428/1005* (2015.01); *Y10T 428/1023* (2015.01)

(58) Field of Classification Search
CPC ......... G02F 1/134309; G02F 1/136227; Y10T 428/10; Y10T 428/1005; Y10T 428/1018; Y10T 428/1023; C09K 19/56; C08G 73/10; C08G 73/1007; C08G 73/1046; C08G 73/1064; C09D 179/08
USPC ........ 428/1.1, 1.2, 1.25, 1.26; 349/123, 130, 349/132; 524/600, 602; 525/436; 528/310, 350, 353
See application file for complete search history.

(56) References Cited

U.S. PATENT DOCUMENTS

| | | | |
|---|---|---|---|
| 2012/0172522 | A1 | 7/2012 | Shin et al. |
| 2012/0196054 | A1* | 8/2012 | Lee .................. G02F 1/133788 428/1.26 |
| 2014/0066590 | A1 | 3/2014 | Suzuki et al. |
| 2015/0118432 | A1 | 4/2015 | Kho et al. |

FOREIGN PATENT DOCUMENTS

| | | |
|---|---|---|
| JP | 2012093642 | 5/2012 |
| KR | 1020010111318 | 12/2001 |
| KR | 1020080001617 | 1/2008 |
| KR | 1020130118159 | 10/2013 |

OTHER PUBLICATIONS

G. Tillet et al., "Chemical reactions of polymer crosslinking and post-crosslinking at room and medium temperature" Progress in Polymer Science, Sep. 21, 2010, pp. 191-217, vol. 36, Elsevier.

* cited by examiner

- Rigid crosslinker
- Photodecomposition molecule

Insignificant improvement in rearrangement effect

- Rigid crosslinker
- Photodecomposition molecule
- Flexible photodecomposition molecule Significant improvement in rearrangement effect

PHOTO-ALIGNMENT LAYER AND LIQUID CRYSTAL DISPLAY INCLUDING THE SAME

CROSS-REFERENCE TO RELATED APPLICATION

This application claims priority from and the benefit of Korean Patent Application No. 10-2015-0033309, filed on Mar. 10, 2015, which is hereby incorporated by reference for all purposes as if fully set forth herein.

BACKGROUND

Field

Exemplary embodiments relate to a photo-alignment layer and a liquid crystal display including the same.

Discussion of the Background

In order to implement an image by a liquid crystal diode, more specifically, in order to switch liquid crystals by an external electric field between transparent conductive glasses, the liquid crystals needs to be aligned in a predetermined direction at an interface between the liquid crystals and a transparent conductive glass electrode. The degree of uniformity of alignment of the liquid crystals is one of the most important factors in determining excellence of image quality of a liquid crystal display.

Examples of aligning liquid crystals include a rubbing method of applying a polymer layer such as a polyimide on a substrate such as glass and rubbing a surface in a predetermined direction with fibers such as nylon or polyester. However, in the rubbing method, when the fibers and the polymer layer are rubbed together, fine dust or static electricity may occur, which may cause a serious problem when a liquid crystal panel is manufactured.

In order to solve the aforementioned problem, recently, a photo-alignment method where anisotropy is induced on the polymer layer by radiation of light and the liquid crystals are arranged by using anisotropy has been researched.

The above information disclosed in this Background section is only for enhancement of understanding of the background of the inventive concept, and, therefore, it may contain information that does not form the prior art that is already known to a person of ordinary skill in the art.

SUMMARY

Exemplary embodiments provide a photo-alignment layer that can optimize afterimage and film hardness, and a liquid crystal display including the same.

Additional aspects will be set forth in the detailed description which follows, and, in part, will be apparent from the disclosure, or may be learned by practice of the inventive concept.

An exemplary embodiment discloses a photo-alignment layer including: a polyimide; and a crosslinker including an alkylene group ($-C_nH_{2n}-$, where n is a natural number) and a plurality of crosslinking end groups, wherein the plurality of crosslinking end groups include at least two types of end groups or end group derivatives, each type having a different available functional group.

An exemplary embodiment also discloses a liquid crystal display including: a first substrate; a thin film transistor disposed on the first substrate; a first electrode connected to the thin film transistor; and a first alignment layer disposed on the first electrode, wherein the first alignment layer includes a polyimide and a crosslinker including an alkylene group ($-C_nH_{2n}-$, n is a natural number) and a plurality of crosslinking end groups, and the plurality of crosslinking end groups include at least two types of end groups or end group derivatives, each type having a different available functional group.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE 'D EMBODIMENTS

Figure 1:
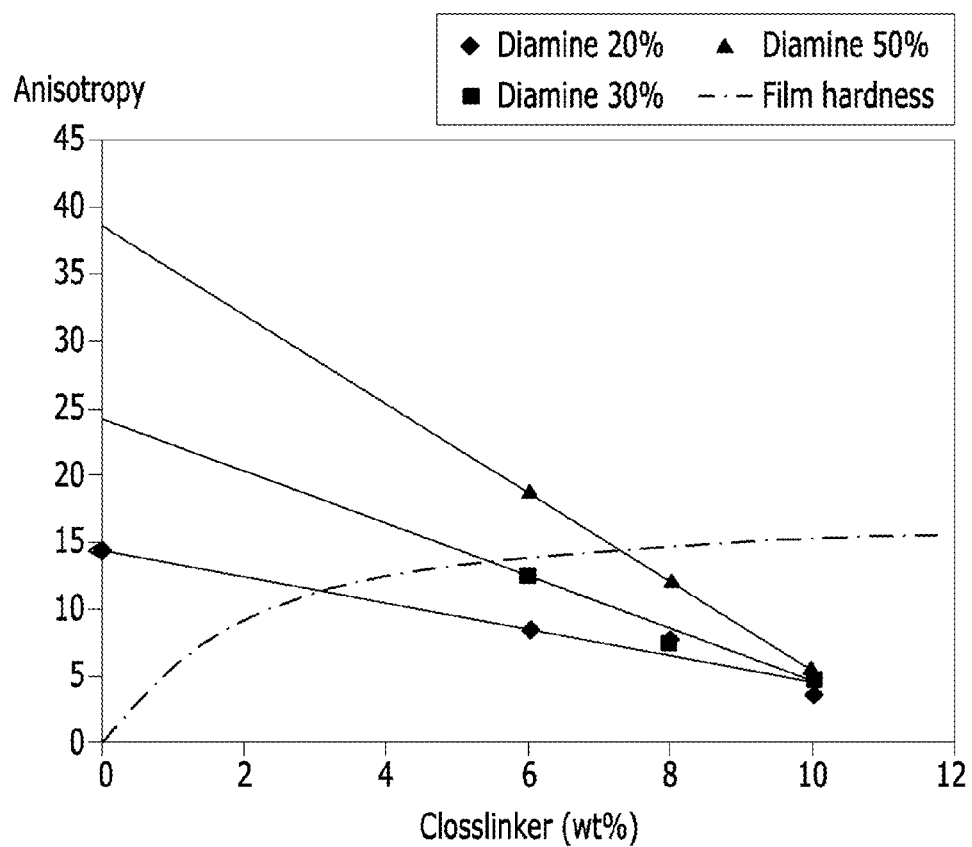
FIG. 1 is a graph illustrating an anisotropic tendency according to an amount of diamine and an amount of crosslinker in a photo-alignment layer according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A photo-alignment agent according to an exemplary embodiment may include at least one of a polyimide and a polyamic acid, and a crosslinker including an alkylene group ($-C_nH_{2n}-$, where n is a natural number) and a plurality of crosslinking end groups. The plurality of crosslinking end groups may include at least two types of end groups or end group derivatives, each type having a different available functional group.

The crosslinking end groups, each having different reactivity, may be disposed at lateral ends of the crosslinker, thereby forming an asymmetrical structure. In an exemplary embodiment, temperatures at which crosslinking reactions occur may be different from each other in the crosslinking end groups having different available functional groups.

The crosslinker according to an exemplary embodiment may include at least one of compounds represented by Chemical Formula 1, Chemical Formula 2, and Chemical Formula 3.

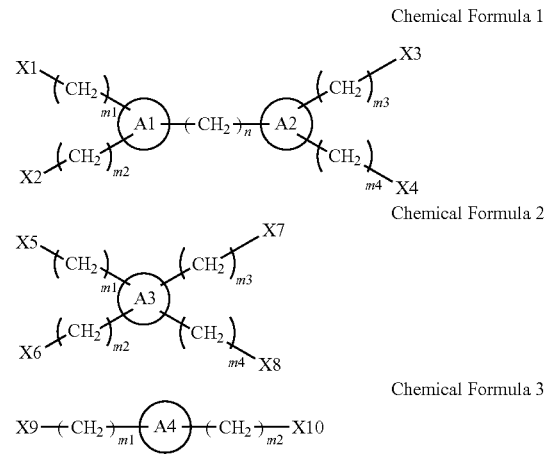

Chemical Formula 1

Chemical Formula 2

Chemical Formula 3

In Chemical Formula 1, Chemical Formula 2, and Chemical Formula 3, n is a natural number of 3 to 11, m1 to m4 are independently a natural number of 1 to 4, and each of A1 and A2 is independently

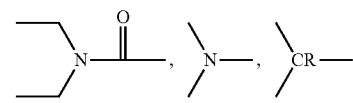

(here, R is H or an alkyl group having 1 to 3 carbon atoms), an aromatic compound having 6 to 30 carbon atoms, or an aliphatic cyclic compound having 4 to 20 carbon atoms, A3 is

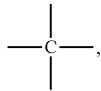

an aromatic compound having 6 to 30 carbon atoms, or an aliphatic cyclic compound having 4 to 20 carbon atoms, and A4 is single bond, —CH2—, —COO—, —OCO—, —S—, —O—, an aromatic compound having 6 to 30 carbon atoms, or an aliphatic cyclic compound having 4 to 20 carbon atoms. Herein, the aromatic compound may be phenyl, alkyl-substituted phenyl, fluorine-substituted phenyl, biphenyl, naphthalene, anthracene, or pentacene, but is not limited thereto. The aliphatic cyclic compound may be cyclohexane, cyclobutane, or cyclopentane, but is not limited thereto.

In Chemical Formula 1, Chemical Formula 2, and Chemical Formula 3, X1, X2, X3, X4, X5, X6, X7, X8, X9, and X10 independently include —OH, —$NH_2$, an aryl group, a vinyl group,

aziridine, or carbodiimide.

According to an exemplary embodiment, the crosslinker may be included with a content of 3 wt % to 10 wt % with respect to the entire content of the photo-alignment agent. Preferably, the crosslinker may be included with a content of 5 wt % to 7 wt %.

According to an exemplary embodiment, the crosslinker may include a compound represented by Chemical Formula 1-1.

Chemical Formula 1-1

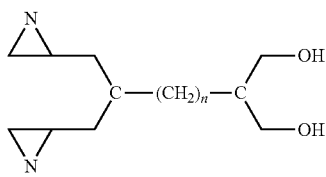

In Chemical Formula 1-1, n is a natural number of 3 to 11.

As described above, since the crosslinker according to an exemplary embodiment includes an alkylene group (—$CH_2$—) that corresponds to a flexible group, film hardness can be improved and afterimage deterioration can be minimized in a photo-alignment layer formed using the photo-alignment agent to which the crosslinker is added. In addition, the crosslinking end groups in which temperatures for crosslinking reaction are different from each other are disposed at both ends of the crosslinker, and accordingly the crosslinker can be uniformly distributed in the photo-alignment agent.

In an exemplary embodiment, polyamic acid may include a repeated unit of a fourth compound represented by Chemical Formula 4 and may include a repeated unit of a fifth compound represented by Chemical Formula 5.

Chemical Formula 4

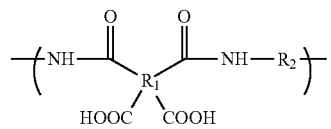

Chemical Formula 5

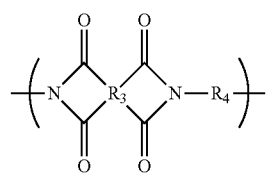

In Chemical Formula 4 and Chemical Formula 5, R1 and R3 may be, independently of each other, a tetravalent organic group derived from aliphatic cyclic acid dianhydride or aromatic acid dianhydride; and R2 and R4 may be, independently of each other, a divalent organic group derived from aromatic diamine.

The polyimide or the polyamic acid may be a copolymer of (a) at least one of cyclobutane dianhydride (CBDA) and cyclobutane dianhydride (CBDA) derivatives and (b) a first diamine.

The cyclobutane dianhydride (CBDA) and cyclobutane dianhydride (CBDA) derivatives may include a compound represented by Chemical Formula 8.

Chemical Formula 8

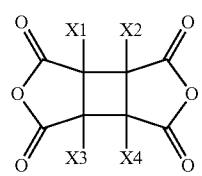

In Chemical Formula 8, each of X1, X2, X3, and X4 may be independently hydrogen, a halogen, an unsubstituted or substituted alkyl group, an unsubstituted or substituted aryl group, or an unsubstituted or substituted heteroaryl group. Here, in case where X1 to X4 are all hydrogen, the compound may be cyclobutane dianhydride.

In Chemical Formula 8, the cyclobutane dianhydride may include a compound represented by the following Chemical Formula 8-1, and the cyclobutane dianhydride derivative may include a compound represented by the following Chemical Formula 8-2 or Chemical Formula 8-3.

Chemical Formula 8-1

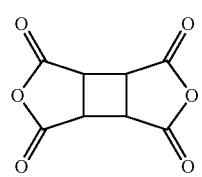

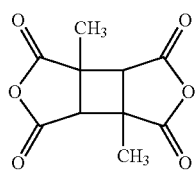

Chemical Formula 8-2

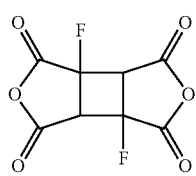

Chemical Formula 8-3

According to an exemplary embodiment, the first diamine may include an alkylene group (—CkH2k-, where k is a natural number). The first diamine may be a compound represented by Chemical Formula 6.

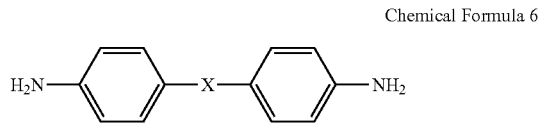

Chemical Formula 6

In Chemical Formula 6, X may be —(CH$_2$)$_h$—, —S—(CH$_2$)$_h$—S—, —O—(CH$_2$)$_h$—O—,

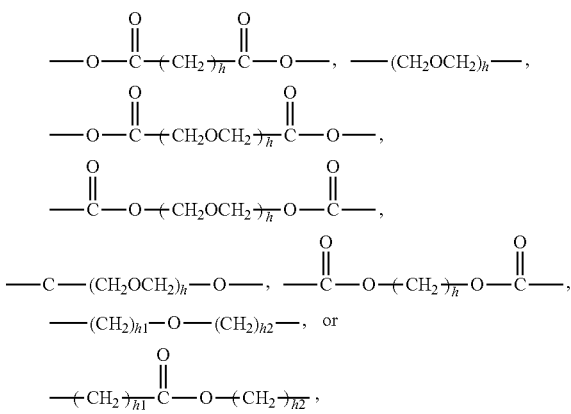

and h is a natural number of 1 to 10, and h1 and h2 are natural numbers selected so that a sum of carbon atoms of an alkylene group of X is 2 to 10.

The photo-alignment agent according to an exemplary embodiment may further include a second diamine represented by the following Chemical Formula 7.

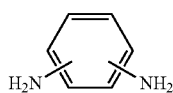

Chemical Formula 7

The second diamine may not be limited to the compound represented by the above Chemical Formula 7, and may be a compound of Chemical Formula 7 wherein hydrogen connected to a cyclic carbon is substituted with an alkyl group, a halogen, sulfur, or the like, an aromatic diamine such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenyl methane, diaminodiphenyl ether, 2,2'-diaminodiphenyl propane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane, and 2,2-bis[4-(4-aminophenoxy)phenyl]hexafluoropropane, an alicyclic diamine such as bis(4-aminocyclohexyl)methane and bis(4-amino-3-methylcyclohexyl)methane, an aliphatic diamine such as tetramethylenediamine and hexamethylenediamine, and the like. However, the second diamine is not particularly limited thereto, and most of the diamine having an inflexible property except for the first diamine may be included.

According to an exemplary embodiment, a mole ratio between the first diamine and the second diamine may be 1:99 to 99:1, preferably about 20:80 to 50:50.

As such, since the first diamine according to an exemplary embodiment includes an alkylene group (—CH2-) corresponding to a flexible group, the photo-alignment layer formed by using the photo-alignment agent including a copolymer of the first diamine has a flexible property and, accordingly, has improved anisotropy to improve an after-image.

Hereinafter, an example of a method of manufacturing a photo-alignment agent according to an exemplary embodiment will be described.

Manufacturing Method of Photo-Alignment Agent

In a four-neck flask equipped with a stirrer, a temperature controller, a nitrogen gas injector, and a condenser, 0.5 mol of a compound represented by the following Chemical Formula 6 was placed while passing nitrogen therethrough, under a dark room condition, and N-methyl-2-pyrrolidone (NMP) was placed therein to prepare a mixed solution. In the mixed solution, 1.0 mol of a compound represented by Chemical Formula 8 in a solid state was placed, and the mixture was stirred for about 1 hour. Then, 0.5 mol of a compound represented by Chemical Formula 7 was injected therein to be reacted. The reaction was carried out for about 24 hours while maintaining the temperature at 30 to 60° C., thereby preparing a polyamic acid solution. The thus-prepared polyamic acid solution was distilled to obtain a polyamic acid. The thus-obtained polyamic acid had a weight average molecular weight of 3 to 50,000. To the polyamic acid, a mixed solvent of N-methyl-2-pyrrolidone (NMP) and 2-butyl cellosolve (volume ratio=about 7:2) was added, and the mixture was stirred at room temperature for 24 hours. About 5 to 7 wt % of a capping group represented by Chemical Formula 1-1 was added to the mixture to manufacture a photo-alignment agent including polyamic acid and a crosslinker.

Chemical Formula 6

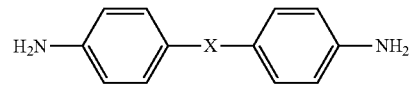

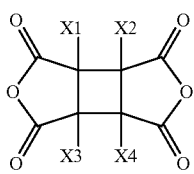

Chemical Formula 7

Chemical Formula 8

In Chemical Formula 6, X is —(CH$_2$)$_h$—, —S—(CH$_2$)$_h$—S—, or —O—(CH$_2$)$_h$—O— (where h is a natural number of 1 to 10), and in Chemical Formula 8, X1 and X4 are a methyl group, and X2 and X3 are hydrogen.

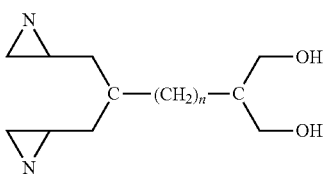

Chemical Formula 1-1

In Chemical Formula 1-1, n is a natural number of 3 to 11.

Manufacturing Method of Photo-Alignment Layer

The photo-alignment agent as described above was applied on an electrode, and the applied photo-alignment agent was baked. The baking process may proceed by two steps of prebaking and hard baking.

Thereafter, a photo-alignment layer may be formed by irradiating the photo-alignment agent with polarized light. Herein, the irradiated light may be ultraviolet rays having a range of 240 to 380 nanometers. Preferably, ultraviolet rays of 254 nanometers may be used. The polarized light may have energy of 0.20 to 1.0 J/cm2, and may preferably have energy of 0.40 to 0.50 J/cm2.

In order to increase alignment, the photo-alignment layer may be baked once more (hereinafter, referred to as a second baking process).

A polyimide included in the photo-alignment layer according to an exemplary embodiment may include a repeated unit of a fifth compound represented by Chemical Formula 5:

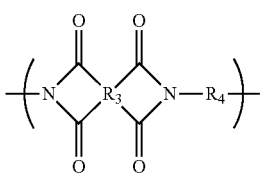

Chemical Formula 5 wherein R3 is a tetravalent organic group derived from an aliphatic cyclic acid dianhydride or an aromatic acid dianhydride; and R4 is a divalent organic group derived from an aromatic diamine.

The copolymer included in the photo-alignment agent according to an exemplary embodiment may include at least one of repeated units represented by Chemical Formula 9 and Chemical Formula 10:

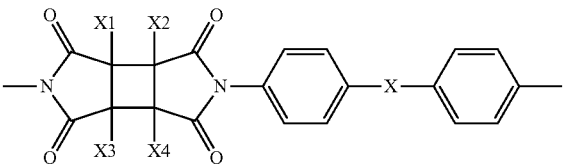

Chemical Formula 9

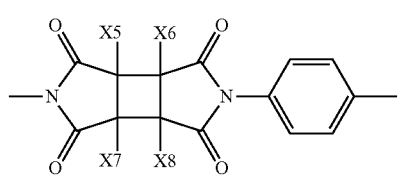

Chemical Formula 10 wherein X is —(CH$_2$)$_h$—, —S—(CH$_2$)$_h$—S—, —O—(CH$_2$)$_h$—O—,

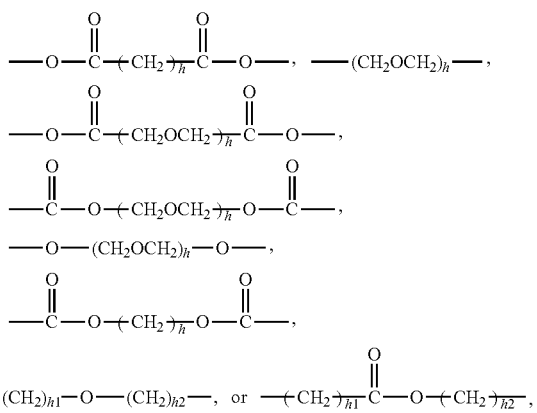

h is a natural number of 1 to 10, h1 and h2 are, independently, a natural number selected so that the sum of carbon atoms of an alkylene group of X is 2 to 10, and X1 to X8 are, independently, hydrogen, a halogen, an unsubstituted or substituted alkyl group, an unsubstituted or substituted aryl group, or an unsubstituted or substituted heteroaryl group.

Preferably, the photo-alignment layer according to an exemplary embodiment may include a copolymer represented by Chemical Formula 11:

Chemical Formula 11

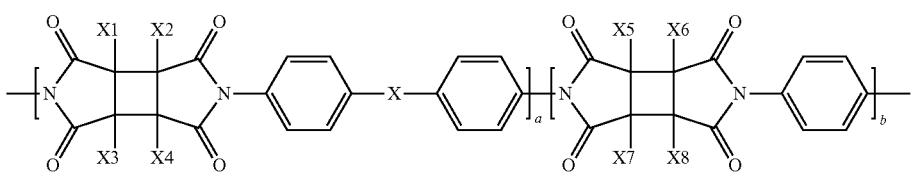

wherein X is —(CH$_2$)$_h$—, —S—(CH$_2$)$_h$—S—, —O—(CH$_2$)$_h$—O—,

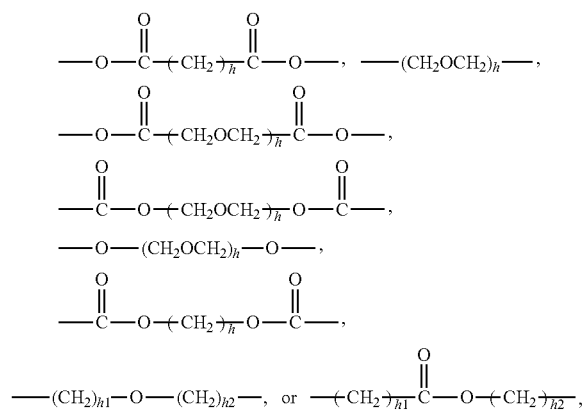

h is a natural number of 1 to 10, h1 and h2 are, independently, a natural number selected so that the sum of carbon atoms of an alkylene group of X is 2 to 10, a:b is 20:80 to 50:50, and X1 to X8 are, independently, hydrogen, a halogen, an unsubstituted or substituted alkyl group, an unsubstituted or substituted aryl group, or an unsubstituted or substituted heteroaryl group.

FIG. 1 is a graph illustrating an anisotropy tendency according to the amount of flexible diamine and the amount of crosslinker in a photo-alignment layer according to an exemplary embodiment.

Referring to FIG. 1, anisotropy increases as the amount of flexible diamine described above increases according to an exemplary embodiment, thereby an afterimage can be improved. However, film hardness of the photo-alignment layer may be deteriorated. In general, the film hardness can be improved by adding a crosslinker to the photo-alignment layer. However, when the amount of rigid crosslinker increases, the afterimage may be deteriorated.

Figure 2:
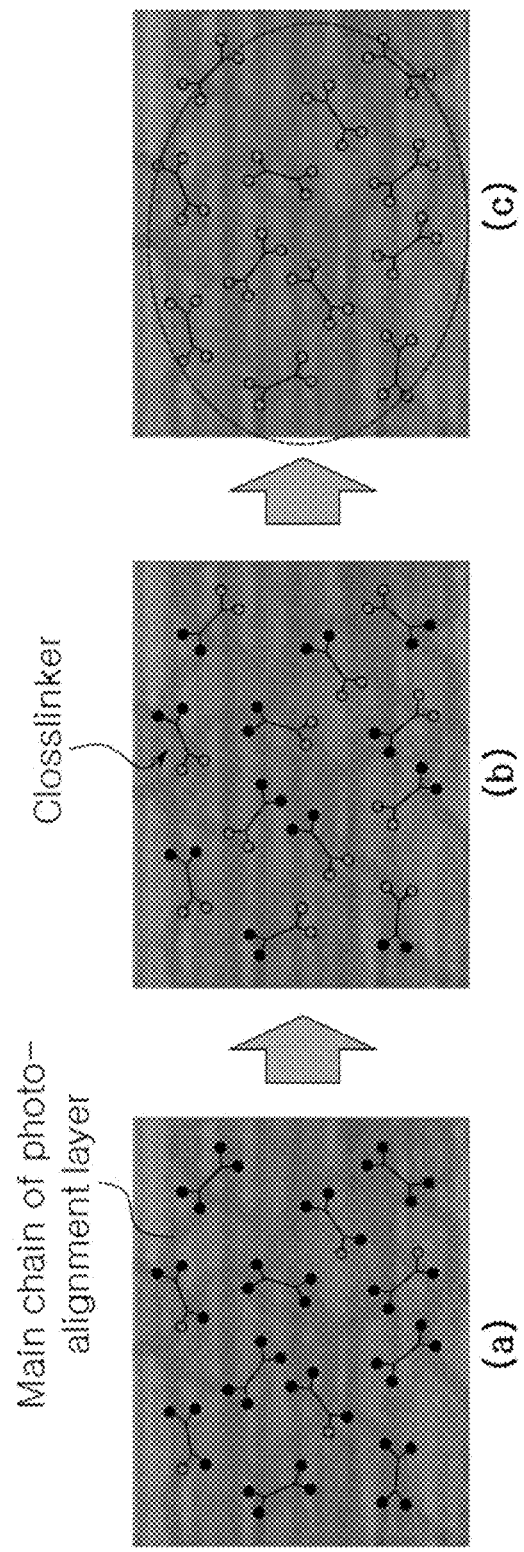
FIG. 2 schematically shows a crosslinker mixed with a photo-alignment layer according to an exemplary embodiment.

FIG. 2 schematically shows a crosslinker mixed to the photo-alignment layer according to an exemplary embodiment.

Referring to FIG. 2, polyamic acid or polyimide is printed to a substrate or an electrode in (a) and prebaking is performed in (b). Then, a crosslinking end group including a functional group such as aziridine or carbodiimide, disposed on an end of the crosslinker, performs a crosslinking reaction at a temperature between room temperature to 80° C.

The crosslinking end group of aziridine or carbodiimide has higher reactivity than a crosslinking end group such as epoxy, —OH, or —NH2. When the crosslinking end group of aziridine or carbodiimide is used to both ends of the crosslinker, a reaction partially occurs in a liquid state such that the length of a polymer main chain is increased. Accordingly, a printing failure may occur. Further, when the same type of crosslinking end group is applied to both ends of the crosslinker, the crosslinkers may be agglomerated. Accordingly, the crosslinker may be unevenly distributed, thereby deteriorating film hardness. However, as illustrated in an exemplary embodiment, when the crosslinking end group of aziridine having high reactivity is applied to only one end among lateral ends of the crosslinker, a crosslinking reaction occurs in a uniform state such that the crosslinker can be evenly distributed, thereby improving film hardness.

In (c), hard baking is performed and thus a crosslinking end group such as epoxy, —OH, or —NH2 disposed at the other end of the crosslinker performs a crosslinking reaction at a temperature between about 150° C. to about 200° C.

In the process of forming the photo-alignment layer according to an exemplary embodiment, when a functional group included in the crosslinking end group before crosslinking reaction is called an end group, a state in which a functional group included in the crosslinking end group is connected with a polymer main chain through a crosslinking reaction may be represented with an end group derivative. A part of the functional group during the crosslinking reaction may maintain the end group state rather than being connected with the polymer main chain.

Figure 3:
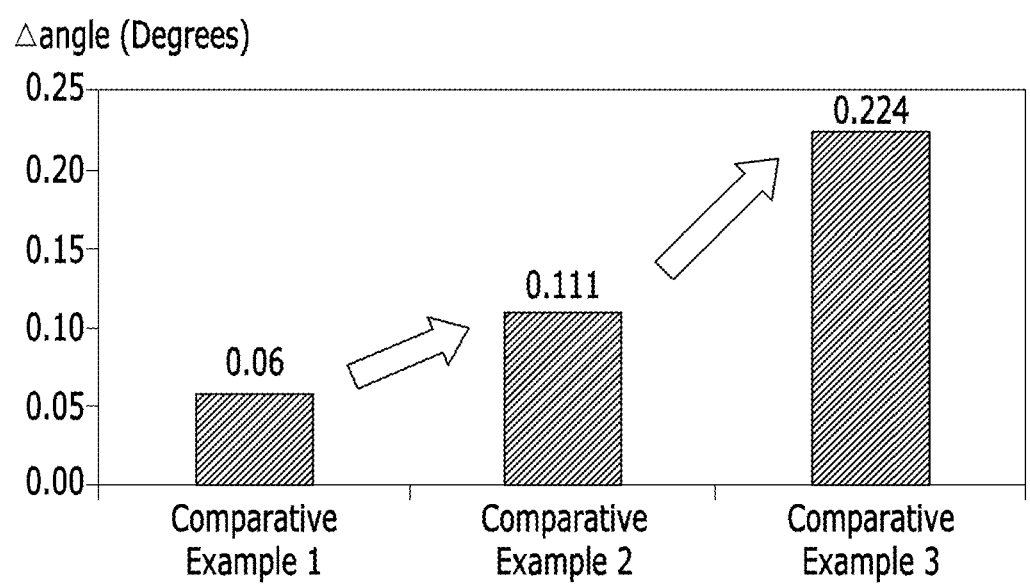
FIG. 3 is a graph illustrating the degree of an afterimage in a case where a rigid crosslinker is added to a photo-alignment layer.

FIG. 3 is a graph illustrating an afterimage degree in a case where a rigid crosslinker is added to a photo-alignment layer. The angle in the Y-axis of FIG. 3 represents a degree that a liquid crystal material cannot return to an initial state at a voltage-off instant, and an afterimage may be deteriorated as the angle increases.

In FIG. 3, Comparative Example 1 is a photo-alignment layer in which a crosslinker is not added to a photo-alignment agent that includes a copolymer of flexible diamine according to an exemplary embodiment, Comparative Example 2 is a photo-alignment layer in which a rigid crosslinker represented by Chemical Formula 4R is added with a content of 3 wt % to a photo-alignment agent including the copolymer of the flexible diamine, and Comparative Example 3 is a photo-alignment layer in which a rigid crosslinker represented by Chemical Formula 4R is added with a content of 5 wt % to the copolymer of the flexible diamine. In Comparative Example 1, Comparative Example 2, and Comparative Example 3, primary baking was performed at 210° C. for about 30 minutes, polarization irradiation of 0.5 J/cm2 was performed, and secondary baking was performed at 210° C. for about 30 minutes.

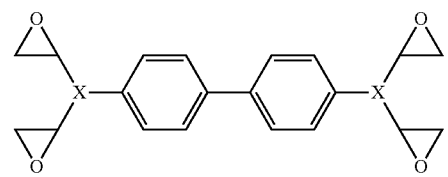

Chemical Formula 4R
Herein, X may be

Referring to FIG. 3, the afterimage is more deteriorated as the amount of rigid crosslinker increases. Thus, such a rigid crosslinker is inappropriate for use as a crosslinker for improvement of film hardness in the photo-alignment layer formed using the flexible diamine.

Figure 4:
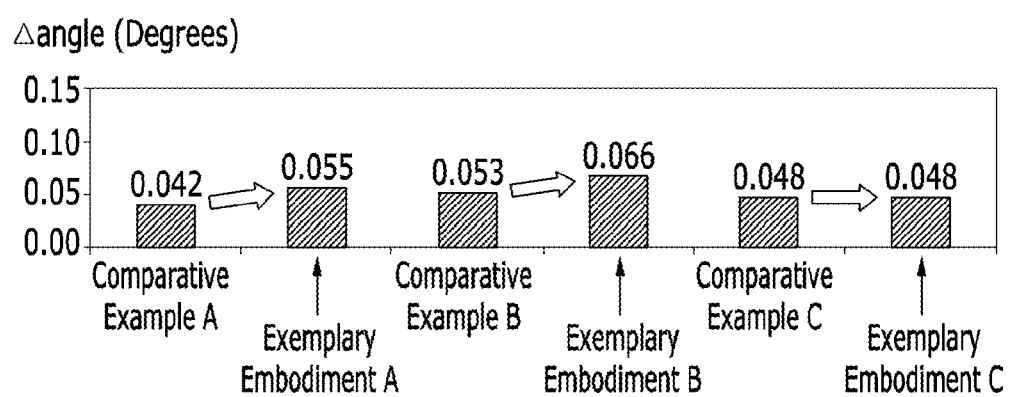
FIG. 4 is a graph illustrating the degree of an afterimage of a photo-alignment layer in which a flexible crosslinker is added according to exemplary embodiments.

FIG. 4 is a graph illustrating the degree of an afterimage of a photo-alignment layer to which a flexible crosslinker is added according to an exemplary embodiment.

In FIG. 4, Comparative Example A, Comparative Example B, and Comparative Example C are photo-alignment layers where a crosslinker is not added, and Exemplary Embodiment A, Exemplary Embodiment B, and Exemplary Embodiment C are photo-alignment layers to which a flexible cross-linker is added with a content of 3 wt %. In Comparative Example A and Exemplary Embodiment A, primary baking was performed at 230° C. for about 900 seconds, polarization irradiation of 0.5 J/cm2 was performed, and secondary baking was performed at 210° C. for about 900 seconds. In Comparative Example B and Exemplary Embodiment B, primary baking was performed at 230° C. for about 900 seconds, polarization irradiation of 0.5 J/cm2 was performed, and secondary baking was performed at 230° C. for about 900 seconds. In Comparative Example C and Exemplary Embodiment C, primary baking was performed at 240° C. for about 900 seconds, polarization irradiation of 0.5 J/cm2 was performed, and secondary baking was performed at 210° C. for about 900 seconds.

Referring to FIG. 4, the exemplary embodiments A, B, and C where the flexible crosslinker is added show no afterimage deterioration or insignificant afterimage deterioration in comparison with the comparative examples A, B, and C, respectively.

Figure 5:
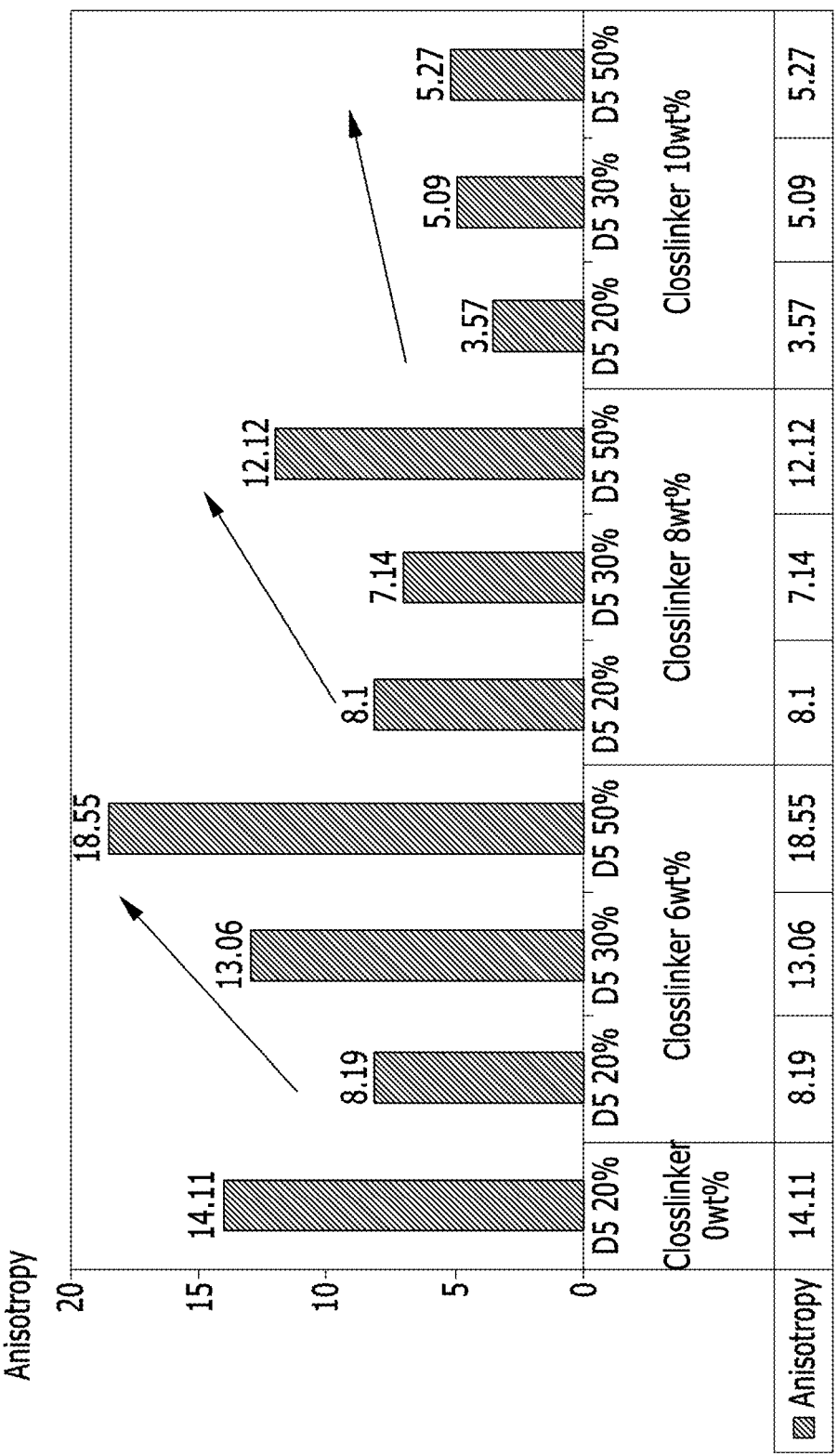
FIG. 5 is a graph illustrating anisotropy in a case where the amount of flexible diamine and the amount of flexible crosslinker included in a photo-alignment layer are changed according to an exemplary embodiment.

FIG. 5 is a graph illustrating anisotropy in a case where the amount of flexible diamine and the amount of flexible crosslinker in a photo-alignment layer are changed according to an exemplary embodiment.

Referring to FIG. 5, when the flexible crosslinker is added according to an exemplary embodiment, anisotropy decreases in comparison with a case where the flexible crosslinker is not added, and thus an afterimage may be deteriorated. However, when the photo-alignment layer is formed using the flexible diamine according to an exemplary embodiment, the decrease of anisotropy caused by the addition of the flexible crosslinker may be sufficiently compensated or anisotropy can be more increased. In FIG. 5, for example, D5 means flexible diamine. D5 20% shows a diamine mole ratio of mixed flexible diamine in comparison with rigid diamine.

Figure 6:
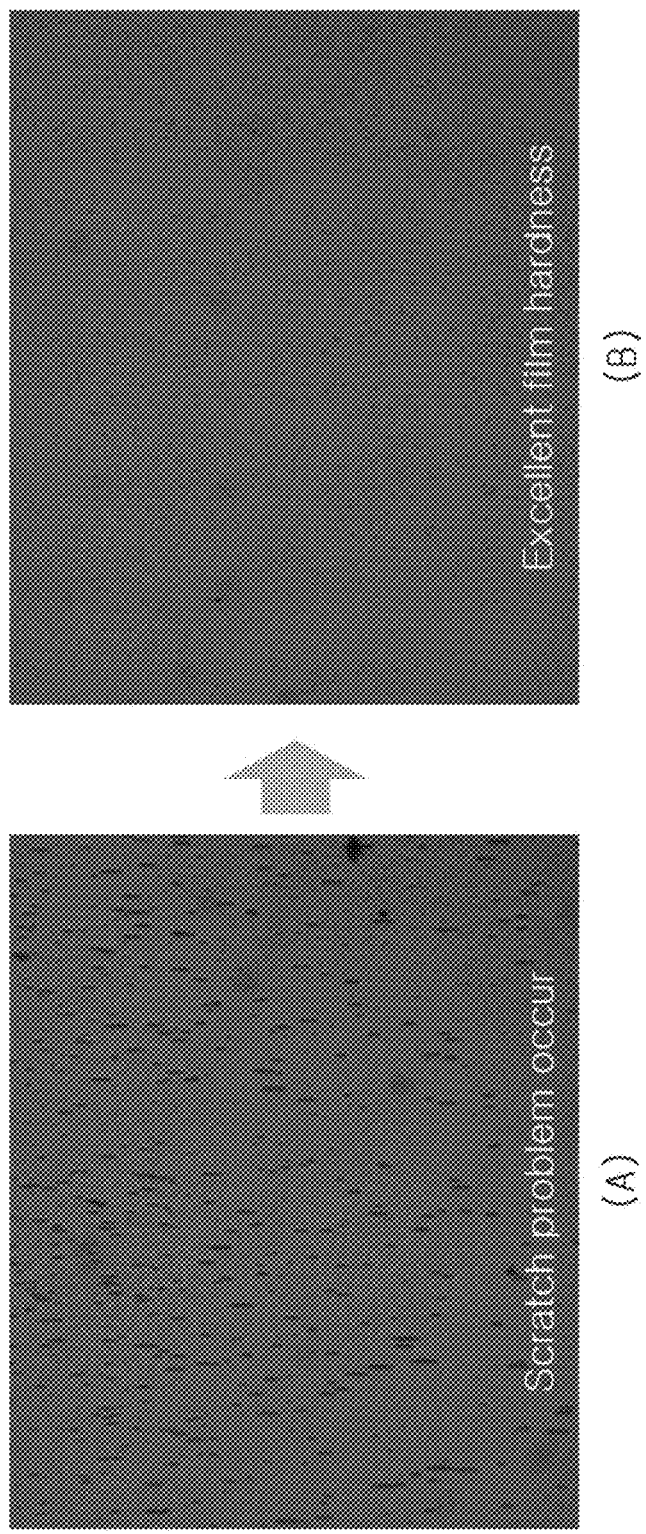
FIG. 6 shows a scratch evaluation for representing an improvement in film hardness according to a type of crosslink reaction group.

FIG. 6 shows a scratch evaluation for representing an improvement of film hardness according to a type of cross-linking reaction group.

In FIG. 6, Exemplary Embodiment (A) shows an evaluation of film hardness in a case where a flexible crosslinker represented by Chemical Formula 1-2 is used, and Exemplary Embodiment (B) shows evaluation of film hardness in a case where a flexible crosslinker represented by Chemical Formula 1-1 is used.

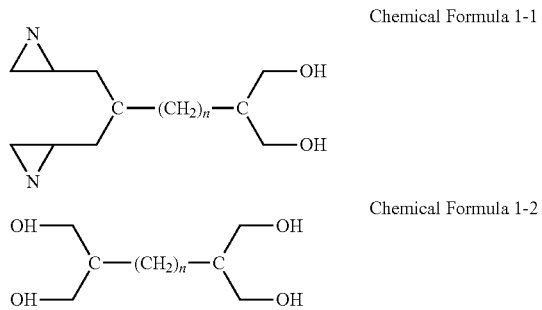

Herein, n is a natural number of 3 to 11.

The crosslinker in Exemplary Embodiment (A) includes a flexible crosslinking end group so that an afterimage may not be deteriorated or insignificantly deteriorated while improving film hardness in comparison with the comparative examples where the crosslinker is not used. However, when the crosslinking end groups at lateral ends of the crosslinker have the same reactivity, the crosslinkers may be agglomerated to each other, thereby deteriorating film hardness. In the crosslinker of Exemplary Embodiment B, crosslinking end groups at lateral ends of the crosslinker have different reactivity so that the crosslinker may be more evenly distributed, thereby improving film hardness.

Referring to FIG. 6, a scratch failure occurs in (A), but film hardness is excellent in (B).

Hereinafter, referring to FIG. 7, FIG. 8, and FIG. 9, a principle of improving afterimage in a photo-alignment layer formed using a photo-alignment agent to which a flexible crosslinker is added according to an exemplary embodiment will be described.

Figure 7:
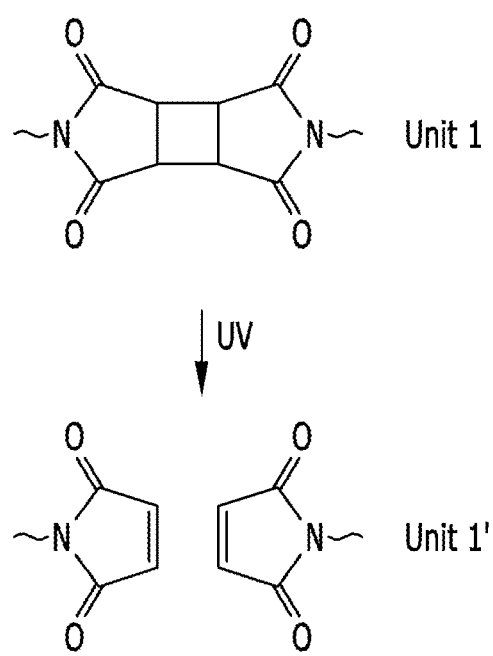
FIG. 7 is a structural formula representing decomposition of a polyimide in a photo-alignment layer according to an exemplary embodiment.

FIG. 7 is a structural formula representing decomposition of polyimide in a photo-alignment layer according to an exemplary embodiment. FIG. 8 shows a process through which a photo-alignment layer is changed from isotropic to anisotropic according to an exemplary embodiment.

Referring to FIG. 7, polyamic acid is formed by cyclobutane dianhydride (CBDA) and diamine and then the polyamic acid is baked to form polyimide (i.e., Unit 1), and UV is radiated to the polyimide to form a maleimide (i.e., Unit 1').

Figure 8:
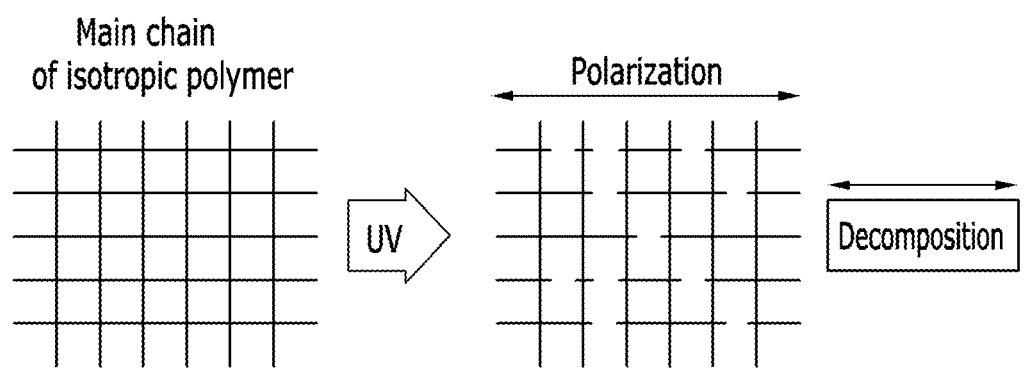
FIG. 8 shows a process through which a photo-alignment layer is changed from isotropic to anisotropic according to an exemplary embodiment.

FIG. 8 illustrates that a polymer main chain including polyimide (Unit 1) illustrated in FIG. 7 is decomposed to be aligned according to the irradiation of polarized UV to the polyimide. Referring to FIG. 8, if polarized UV is radiated on an isotropic polymer main chain, photodecomposition occurs in a polarization direction (absorption axis direction), and thus a photo-alignment layer may be aligned in a direction that is perpendicular to the polarization direction. If the exposure amount is excessively small, since decomposition efficiency is low, the alignment property may deteriorate. If the exposure amount is excessively increased, since decomposition efficiency is increased, decomposition occurs in another direction in addition to the polarization direction, and thus the alignment property may deteriorate.

Figure 9:
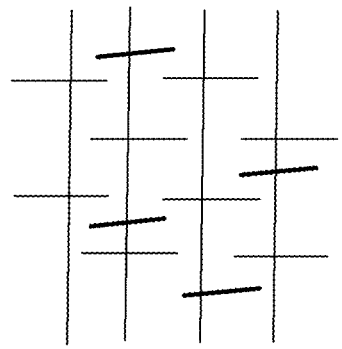
FIG. 9 shows a principle of improving afterimages in a photo-alignment layer formed using a photo-alignment agent to which a flexible crosslinker is added according to an exemplary embodiment.
Figure 9:
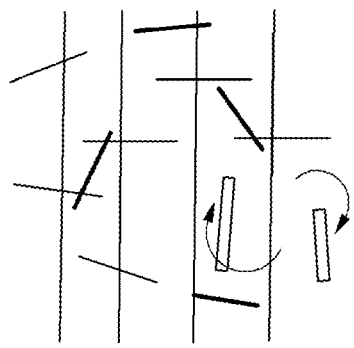
Figure 9:
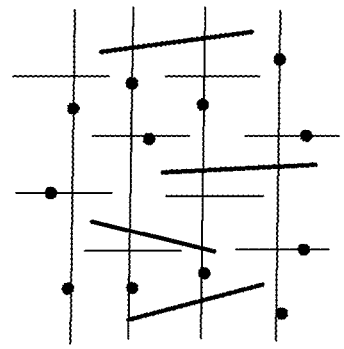
Figure 9:
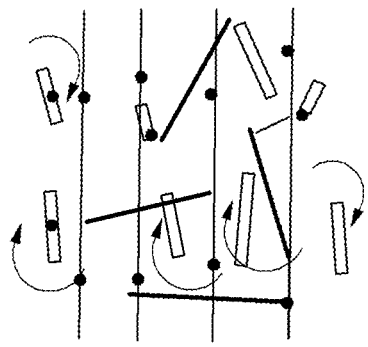

FIG. 9 shows a principle of improving an afterimage in the photo-alignment layer formed using a photo-alignment agent to which a flexible crosslinker is added according to an exemplary embodiment.

Referring to FIG. 9, when a second baking process is performed on a photo-alignment layer including a rigid crosslinker, the rigid crosslinker interrupts rearrangement of photolysis molecules, so that afterimage improvement effect is insignificant. However, when a second baking process is performed on a photo-alignment layer including a flexible crosslinker, rearrangement of photolysis molecules is good, so the afterimage improvement effect may be significant. Further, according to an exemplary embodiment, a crosslinker having an asymmetric structure is used so that uniform crosslinking distribution can be achieved, thereby improving film hardness.

Hereinafter, a liquid crystal display capable of applying the alignment layer described above according to an exemplary embodiment will be described in detail.

Figure 10:
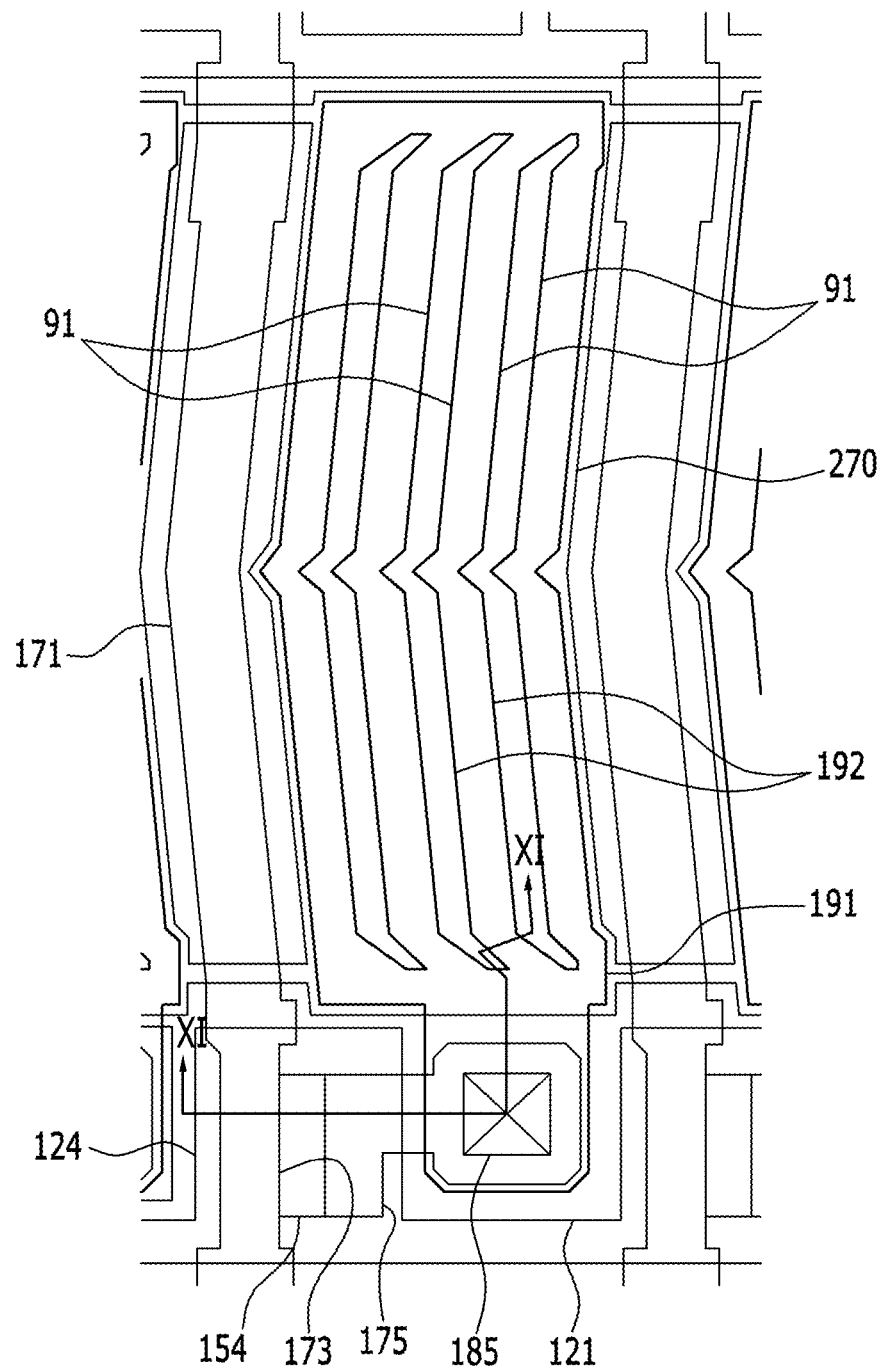
FIG. 10 is a top plan view of a liquid crystal display according to an exemplary embodiment.
Figure 11:
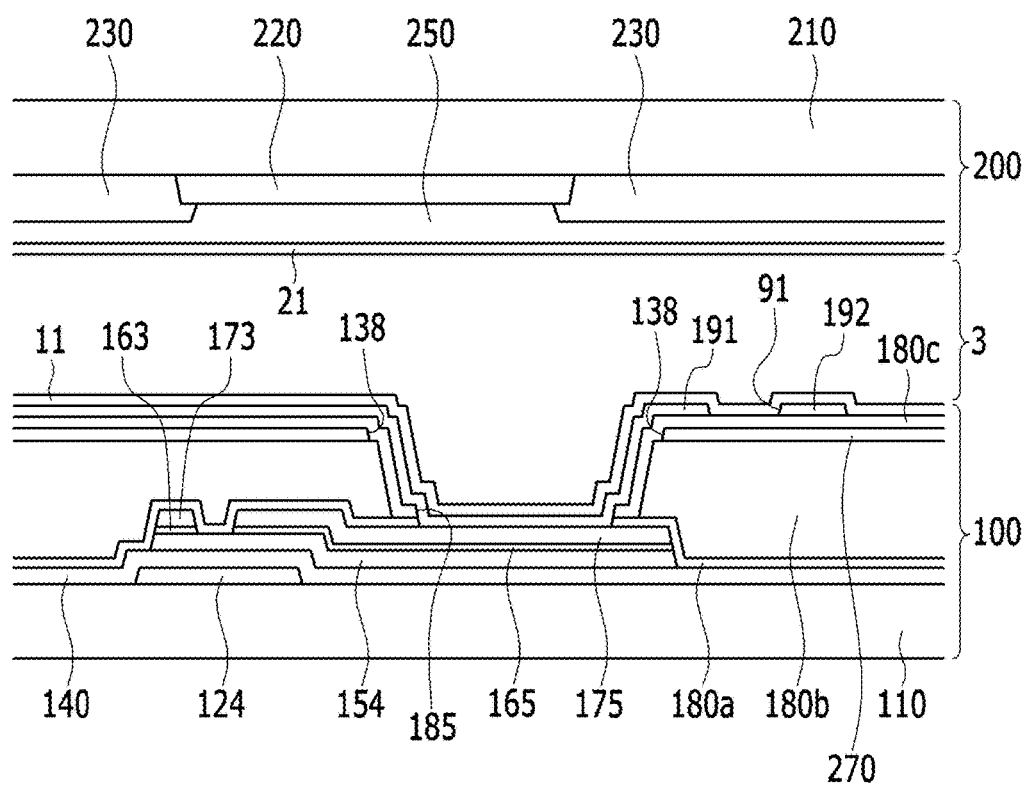
FIG. 11 is a cross-talk of FIG. 10, taken along section line XI-XI.

FIG. 10 is a top plan view of a liquid crystal display according to an exemplary embodiment. FIG. 11 is a cross-sectional view of FIG. 10, taken along section line XI-XI.

Referring to FIG. 10 and FIG. 11, a liquid crystal display according to an exemplary embodiment includes a lower panel 100, an upper panel 200, and a liquid crystal layer 3. The lower panel 100 and the upper panel 200 are disposed facing each other, and the liquid crystal layer 3 is injected between the two panels, the lower panel 100 and the upper panel 200.

First, the lower panel 100 will be described.

A gate conductor including a gate line 121 is formed on a first substrate 110, which includes or is made of transparent glass or plastic.

The gate line 121 may include a gate and a wide end portion (not shown) for connection to another layer or an external driving circuit. The gate line 121 may include or may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). Further, the gate line 121 may have a multilayered structure including at least two conductive layers having different physical properties.

A gate insulating layer 140 may include or may be made of a silicon nitride ($SiN_x$), a silicon oxide ($SiO_x$), or the like. The gate insulating layer 140 may be formed on the gate conductors 121 and 124. The gate insulating layer 140 may have a multilayered structure including at least two insulating layers having different physical properties.

A semiconductor 154 may include or may be made of amorphous silicon, polysilicon, or the like. The semiconductor 154 may be formed on the gate insulating layer 140. The semiconductor 154 may include an oxide semiconductor.

Ohmic contacts 163 and 165 may be positioned on the semiconductor 154. The ohmic contacts 163 and 165 may include or may be made of a material such as n+ hydrogenated amorphous silicon in which an n-type impurity such as phosphorus is doped at a high concentration, or a silicide. The ohmic contacts 163 and 165 may be disposed on the semiconductor 154 to form a pair. In the case where the semiconductor 154 is an oxide semiconductor, the ohmic contacts 163 and 165 may be omitted.

A first data conductor, which includes a data line 171 including a source electrode 173, and a second data conductor, which includes a drain electrode 175, may be positioned on the ohmic contacts 163 and 165, respectively, and the gate insulating layer 140.

The data line 171 includes an end portion (not shown) for connection with another layer or an external driving circuit. The data line 171 transfers a data signal, and mainly extends in a vertical direction to cross the gate line 121, which extends in a horizontal direction.

The data line 171 may have a first curved portion with a curved shape in order to acquire enhanced transmittance properties of the liquid crystal display, and parts of the curved portion may meet each other in a middle region of the pixel area to have a V-letter shape.

The source electrode 173 may be a part of the data line 171, and disposed on the same line as the data line 171. The drain electrode 175 may be formed to extend parallel with the source electrode 173. Accordingly, the drain electrode 175 is parallel with the part of the data line 171.

The gate electrode 124, the source electrode 173, and the drain electrode 175 form one thin film transistor (TFT) together with the semiconductor 154, and a channel of the thin film transistor is formed in the semiconductor 154 between the source electrode 173 and the drain electrode 175.

The liquid crystal display according to an exemplary embodiment includes the source electrode 173 positioned on the same line as the data line 171 and the drain electrode 175 extending parallel with the data line 171, and as a result, the width of the thin film transistor may be increased while an area occupied by the data conductor is not increased, thereby increasing an aperture ratio of the liquid crystal display.

The data line 171 and the drain electrode 175 may include or may be made of a refractory metal such as molybdenum, chromium, tantalum, and titanium, or an alloy thereof, and may have a multilayered structure including a refractory metal layer (not illustrated) and a low resistance conductive layer (not illustrated). An example of the multilayered structure may include a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer.

A first passivation layer 180a may be disposed on the data conductors 171, 173, and 175, the gate insulating layer 140, and an exposed portion of the semiconductor 154. The first passivation layer 180a may include or may be made of an organic insulating material, an inorganic insulating material, or the like.

A second passivation layer 180b may be disposed on the first passivation layer 180a. The second passivation layer 180b may be formed of an organic insulator.

The second passivation layer 180b may be a color filter. If the second passivation layer 180b serves as a color filter, the second passivation layer 180b may display one of primary colors such as red, green, yellow, cyan, and magenta, or the like. Although not illustrated, the color filter may further include a color filter displaying a mixed color of the primary colors or white in addition to the primary colors. If the second passivation layer 180b serves as a color filter, a color filter 230 may be omitted in the upper panel 200. According to another exemplary embodiment, the second passivation layer 180b may be formed of an organic insulating material and a color filter (not shown) may be disposed between the first passivation layer 180a and the second passivation layer 180b.

A common electrode 270 may be disposed on the second passivation layer 180b. The common electrode 270 may have a planar shape so as to be formed on the entire surface of the substrate 110 as a whole plate, and has an opening 138 which is formed in a region corresponding to the periphery of the drain electrode 175. In an example, the common electrode 270 may have a planar shape in a plane view.

Common electrodes 270 which are disposed in adjacent pixels are connected to each other so that a common voltage having a predetermined magnitude supplied from outside the display area can be transmitted thereto.

An insulating layer 180c is disposed on the common electrode 270. The insulating layer 180c may include or may be formed of an organic insulating material or an inorganic insulating material.

A pixel electrode 191 may be disposed on the insulating layer 180c. The pixel electrode 191 includes a curved edge which is substantially parallel to the first curved portion and the second curved portion of the data line 171. The pixel electrode 191 includes a plurality of openings 91 and a plurality of branch electrodes 192 disposed between neighboring openings 91.

The pixel electrode 191 is a first field generating electrode or a first electrode, and the common electrode 270 is a second field generating electrode or a second electrode. The pixel electrode 191 and the common electrode 270 may form a fringe field.

A first contact hole 185 exposing the drain electrode 175 may be formed in the first passivation layer 180a, the second passivation layer 180b, and the insulating layer 180c. The pixel electrode 191 physically and electrically connects to the drain electrode 175 through the contact hole 185 such that a voltage can be applied to the pixel electrode 191 from the drain electrode 175.

A first alignment layer 11 is formed on the pixel electrode 191 and the insulating layer 180c. The first alignment layer 11 may include a photo-alignment layer. The photo-alignment layer may have the properties illustrated in various exemplary embodiments disclosed herein.

A method of forming the photo-alignment layer will be described.

A photo-alignment agent may be applied on a pixel electrode 191, and the applied photo-alignment agent may be baked. The baking process may proceed in two processes of prebaking and hard baking. In the prebaking process, polyamic acid included in the photo-alignment agent may be partially changed into polyimide, and a crosslink end group of a flexible crosslinker may be esterified at 150 to 200° C. to be connected to neighboring polyimide. In the hard baking process, polyamic acid included in the photo-alignment agent may be changed into polyimide, and the flexible crosslinker may be esterified at 150 to 200° C. to be connected to neighboring polyimide.

Thereafter, the photo-alignment agent may be irradiated with polarized light to form a photolysed first alignment layer 11. In this case, the irradiated light may include ultraviolet rays having the wavelength in a range of 240 nanometers to 380 nanometers. Preferably, ultraviolet rays having the wavelength of 254 nanometers may be used. Polarized light may include energy of 0.20 J/cm2 to 1.0 J/cm2, and preferably energy of 0.40 J/cm2 to 0.50 J/cm2.

In order to increase alignment, the photo-alignment layer may be baked once more (hereinafter referred to as a second bake process). In this case, photolysed molecules may be rearranged to increase anisotropy.

Next, the upper panel 200 will be described.

A light blocking member 220 may be formed on a second substrate 210, which include or made of transparent glass or plastic. The light blocking member 220 is also called a black matrix, and prevents light transmission therethrough.

A plurality of color filters 230 may be formed on the second substrate 210. When the second passivation layer 180b formed on the first passivation layer 180a is a color filter or when the color filter is formed on another layer in the lower panel 100, color filters 230 of the upper panel 200 may be omitted. In addition, the light blocking member 220 of the upper panel 200 may be formed in the lower panel 100 with or without having the light blocking member 220 in the upper panel 200.

An overcoat 250 may be formed on the color filter 230 and the light blocking member 220. The overcoat 250 may include or may be formed of an (organic) insulating material, and may prevent the color filters 230 from being exposed and may provide a flat surface. According to an exemplary embodiment, the overcoat 250 may be omitted.

A second alignment layer 21 may be disposed on the overcoat 250. The second alignment layer 21 may be formed of the same material as the first alignment layer 11 using the same method as the first alignment layer 11.

According to an exemplary embodiment, the liquid crystal layer 3 may include liquid crystals having negative dielectric anisotropy or positive dielectric anisotropy.

The liquid crystal material of the liquid crystal layer 3 may be aligned in a manner so that the major axis thereof are disposed parallel with the display panels 100 and 200.

The pixel electrode 191 receives a data voltage from the drain electrode 175, and the common electrode 270 receives a common voltage having a predetermined magnitude supplied from a common voltage supplier disposed outside of a display area.

The pixel electrode 191 and the common electrode 270, which are field generating electrodes, generate an electric field such that liquid crystal molecules of the liquid crystal layer 3 disposed on the two field generating electrodes 191 and 270 may be perpendicular to a direction of the electric field or rotate in a direction parallel with the direction of the electric field. The polarization of light passing through the liquid crystal layer varies according to the determined rotation direction of the liquid crystal molecules.

As such, the two field generating electrodes 191 and 270 may be formed on one lower panel 100 to enhance transmittance of the liquid crystal display and implement a wide viewing angle.

In the liquid crystal display according to the illustrated exemplary embodiment, the common electrode 270 has a planar-shaped plane form and the pixel electrode 191 has a plurality of branch electrodes. According to an exemplary embodiment, the pixel electrode 191 may have a plane form of a planar shape and the common electrode 270 may have a plurality of branch electrodes.

The illustrated exemplary embodiments may be applied to all other cases including configurations where two field generating electrodes overlap with each other on the first substrate 110 with the insulating layer therebetween, the first field generating electrode formed below the insulating layer has the plane form of the planar shape, and the second field generating electrode formed above the insulating layer has the plurality of branch electrodes.

According to an exemplary embodiment, a photo-alignment layer formed using a diamine including a flexible group and a crosslinker including a flexible group to optimize an afterimage and film hardness, and a liquid crystal display including such a photo-alignment layer, can be implemented.

According to an exemplary embodiment, crosslinking end groups, each having a different functional group, are disposed at lateral ends of the crosslinker so that crosslink reaction can be uniform, thereby improving film hardness.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A photo-alignment layer comprising:
a polyimide; and
a crosslinker comprising: an alkylene group ($—C_mH_{2m}—$), where m is a positive; and a plurality of crosslinking end groups, the crosslinker comprising at least one of a compound represented by Chemical Formula 1, Chemical Formula 2, and Chemical Formula 3:

Chemical Formula 1

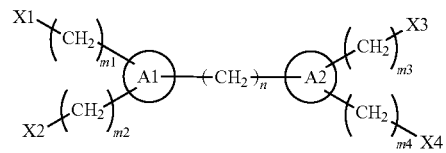

-continued

Chemical Formula 2

[structure: X5-(CH2)m1, X6-(CH2)m2, X7-(CH2)m3, X8-(CH2)m4 attached to A3]

Chemical Formula 3

X9—(CH2)m1—A4—(CH2)m2—X10 where n is a natural number of 3 to 11; m1, m2, m3, and m4 are independently a natural number of 1 to 4;

A1 and A2 are independently

[structures showing N with C=O, N—, and CR— groups]

where R is H or an alkyl group having 1 to 3 carbon atoms, an aromatic compound having 6 to 30 carbon atoms, or an aliphatic cyclic compound having 4 to 20 carbon atoms;

A3 is

[structure: —C— with four bonds]

an aromatic compound having 6 to 30 carbon atoms, or an aliphatic cyclic compound having 4 to 20 carbon atoms;

A4 is a single bond, —CH2—, —COO—, —OCO—, —S—, —O—, an aromatic compound having 6 to 30 carbon atoms, or an aliphatic cyclic compound having 4 to 20 carbon atoms; and X1, X2, X3, X4, X5, X6, X7, X8, X9, and X10 independently comprises —OH, —NH$_2$, an aryl group, a vinyl group,

[epoxide structure], aziridine, or carbodiimide, wherein the plurality of crosslinking end groups comprise at least two types of end groups or end group derivatives, each type having a different available functional group.

2. The photo-alignment layer of claim 1, wherein the different functional groups are disposed at lateral ends of the crosslinker such that the crosslinking end groups form an asymmetrical structure.

3. The photo-alignment layer of claim 2, wherein the crosslinker comprises a compound represented by Chemical Formula 1-1:

Chemical Formula 1-1

[structure with two aziridine groups attached via CH2 to central C-(CH2)n-C with two OH groups]

where n is a natural number of 3 to 11.

4. The photo-alignment layer of claim 2, wherein the polyimide comprises a repeated unit of a compound represented by Chemical Formula 5:

Chemcial Formula 5

[structure: repeating unit with two imide rings connected by R3 and N—R4]

where R3 is a tetravalent organic group derived from an aliphatic cyclic acid dianhydride or an aromatic acid dianhydride; and R4 is a divalent organic group derived from an aromatic diamine.

5. The photo-alignment layer of claim 4, wherein the polyimide is a copolymer of: (a) at least one of cyclobutane dianhydride (CBDA) and cyclobutane dianhydride (CBDA) derivatives; and (b) a first diamine.

6. The photo-alignment layer of claim 5, wherein the first diamine comprises a compound represented by Chemical Formula 6:

Chemical Formula 6

$H_2N$—[phenyl]—X—[phenyl]—$NH_2$ where X is —(CH$_2$)$_h$—, —S—(CH$_2$)$_h$—S—, —O—(CH$_2$)$_h$—O—, —O—C(=O)—(CH$_2$)$_h$—C(=O)—O—,   —(CH$_2$OCH$_2$)$_h$—, —O—C(=O)—(CH$_2$OCH$_2$)$_h$—C(=O)—O—, —C(=O)—O—(CH$_2$OCH$_2$)$_h$—O—C(=O)—, —O—(CH$_2$OCH$_2$)$_h$—O—, —C(=O)—O—(CH$_2$)$_h$—O—C(=O)—, —(CH$_2$)$_{h1}$—O—(CH$_2$)$_{h2}$—,   or   —(CH$_2$)$_{h1}$—C(=O)—O—(CH$_2$)$_{h2}$—;

h is a natural number of 1 to 10; and h1 and h2 are a combination of natural numbers selected so that a sum of carbon atoms of an alkylene group of X is 2 to 10.

7. The photo-alignment layer of claim 6, wherein the copolymer further comprises a polymer of: (a) at least one of cyclobutane dianhydride (CBDA) and cyclobutane dianhydride (CBDA) derivatives; and (b) a second diamine represented by Chemical Formula 7:

Chemical Formula 7

8. The photo-alignment layer of claim 7, wherein the copolymer comprises at least one of repeated units represented by Chemical Formula 9 and Chemical Formula 10:

Chemical Formula 9

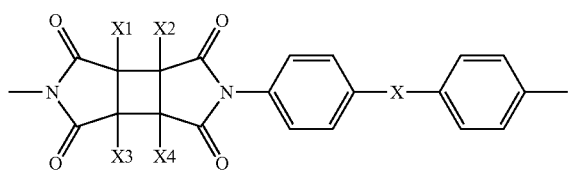

Chemical Formula 10

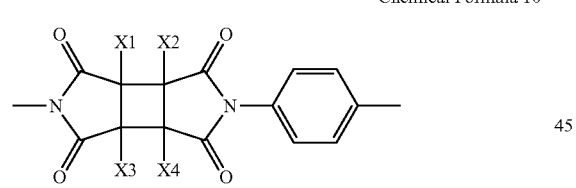

where X is —$(CH_2)_h$—, —S—$(CH_2)_h$—S—, —O—$(CH_2)_h$—O—,

—O—C(=O)—$(CH_2)_h$—C(=O)—O—, —$(CH_2OCH_2)_h$—,

—O—C(=O)—$(CH_2OCH_2)_h$—C(=O)—O—,

—C(=O)—O—$(CH_2OCH_2)_h$—O—C(=O)—,

—O—$(CH_2OCH_2)_h$—O—,

—C(=O)—O—$(CH_2)_h$—O—C(=O)—,

—$(CH_2)_{h1}$—O—$(CH_2)_{h2}$—, or —$(CH_2)_{\overline{h1}}$C(=O)—O—$(CH_2)_{\overline{h2}}$;

h is a natural number of 1 to 10; h1 and h2 are, independently, a natural number selected so that the sum of carbon atoms of an alkylene group of X is 2 to 10; and X1 to X8 are, independently, hydrogen, a halogen, an unsubstituted or substituted alkyl group, an unsubstituted or substituted aryl group, or an unsubstituted or substituted heteroaryl group.

9. The photo-alignment layer of claim 8, wherein the copolymer comprises a compound represented by Chemical Formula 11:

Chemical Formula 11

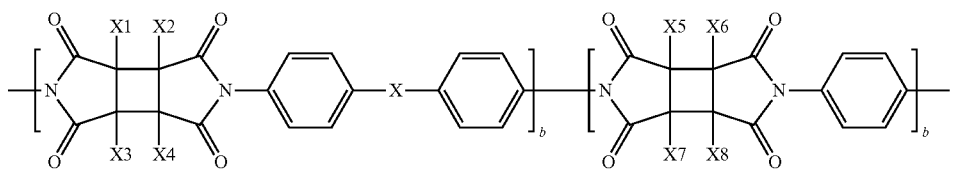

where X is —$(CH_2)_h$—, —S—$(CH_2)_h$—S—, —O—$(CH_2)_h$—O—,

—O—C(=O)—$(CH_2)_h$—C(=O)—O—, —$(CH_2OCH_2)_h$—,

—O—C(=O)—$(CH_2OCH_2)_h$—C(=O)—O—,

—C(=O)—O—$(CH_2OCH_2)_h$—O—C(=O)—,

—O—$(CH_2OCH_2)_h$—O—,

—C(=O)—O—$(CH_2)_h$—O—C(=O)—,

—$(CH_2)_{h1}$—O—$(CH_2)_{h2}$—, or —$(CH_2)_{\overline{h1}}$C(=O)—O—$(CH_2)_{\overline{h2}}$;

h is a natural number of 1 to 10; h1 and h2 are, independently, a natural number selected so that the sum of carbon atoms of an alkylene group of X is 2 to 10; a:b is 20:80 to 50:50; and X1 to X8 are, independently, hydrogen, a halogen, an unsubstituted or substituted alkyl group, an unsubstituted or substituted aryl group, or an unsubstituted or substituted heteroaryl group.

10. A liquid crystal display comprising:
a first substrate;
a thin film transistor disposed on the first substrate;
a first electrode connected to the thin film transistor; and
a first alignment layer disposed on the first electrode, wherein the first alignment layer comprises a polyimide and a crosslinker comprising an alkylene group (—$C_mH_{2m}$—), where m is a positive integer; and a plurality of crosslinking end groups, and the plurality of crosslinking end groups comprise at least two types of end groups or end group derivatives, each type having a different available functional group, and
wherein the crosslinker comprises a compound represented by Chemical Formula 1-1:

Chemical Formula 1-1

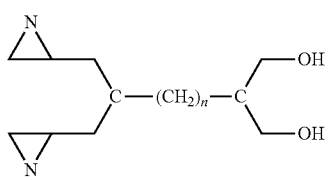

where n is a natural number of 3 to 11.

11. The liquid crystal display of claim 10, wherein the different functional groups are disposed at lateral ends of the crosslinker such that the crosslinking end groups form an asymmetrical structure.

12. The liquid crystal display of claim 11, wherein the crosslinker comprises at least one of a compound represented by Chemical Formula 2 and Chemical Formula 3:

Chemical Formula 2

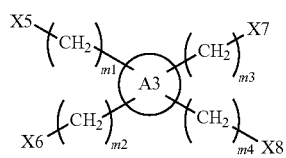

Chemical Formula 3

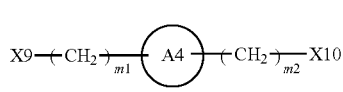

where n is a natural number of 3 to 11; m1, m2, m3, and m4 are independently a natural number of 1 to 4; A3 is

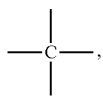

an aromatic compound having 6 to 30 carbon atoms, or an aliphatic cyclic compound having 4 to 20 carbon atoms; and A4 is a single bond, —CH2—, —COO—, —OCO—, —S—, —O—, an aromatic compound having 6 to 30 carbon atoms, or an aliphatic cyclic compound having 4 to 20 carbon atoms, and X3, X4, X5, X6, X7, X8, X9, and X10 independently comprise —OH, —NH$_2$, an aryl group, a vinyl group,

aziridine, or carbodiimide.

13. The liquid crystal display of claim 11, wherein the polyimide comprises a repeated unit of a compound represented by Chemical Formula 5:

Chemical Formula 5

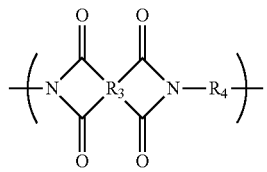

where R3 is a tetravalent organic group derived from an aliphatic cyclic acid dianhydride or an aromatic acid dianhydride; and R4 is a divalent organic group derived from an aromatic diamine.

14. The liquid crystal display of claim 13, wherein the polyimide is a copolymer of: (a) at least one of cyclobutane dianhydride (CBDA) and cyclobutane dianhydride (CBDA) derivatives; and (b) a first diamine.

15. The liquid crystal display of claim 14, wherein the first diamine comprises a compound represented by Chemical Formula 6:

Chemical Formula 6

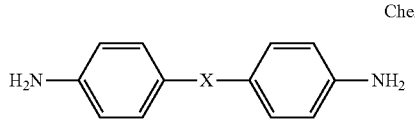

where X is —(CH$_2$)$_h$—, —S—(CH$_2$)$_h$—S—, —O—(CH$_2$)$_h$—O—,

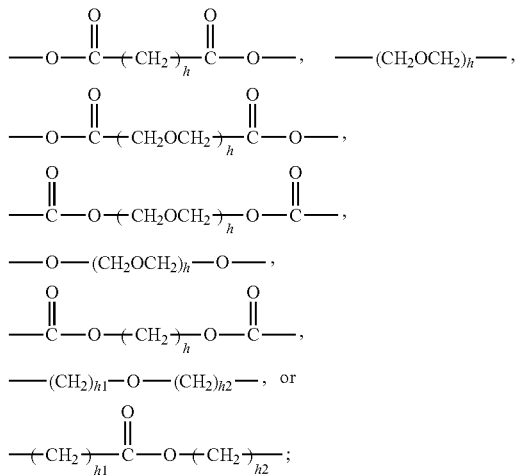

h is a natural number of 1 to 10; and h1 and h2 are a combination of natural numbers selected so that a sum of carbon atoms of an alkylene group of X is 2 to 10.

16. The liquid crystal display of claim 15, wherein the copolymer further comprises a polymer of: (a) at least one of cyclobutane dianhydride (CBDA) and cyclobutane dianhydride (CBDA) derivatives; and (b) a second diamine represented by Chemical Formula 7:

Chemical Formula 7

17. The liquid crystal display of claim 16, wherein the copolymer comprises at least one of repeated units represented by Chemical Formula 9 and Chemical Formula 10:

Chemical Formula 9

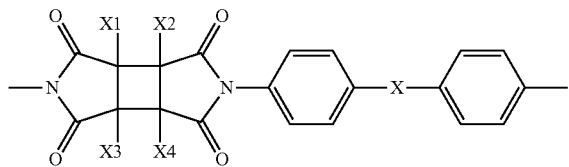

Chemical Formula 10

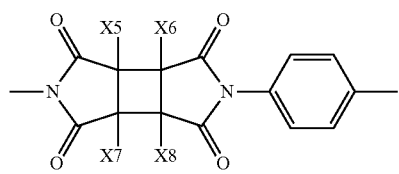

where X is —$(CH_2)_h$—, —S—$(CH_2)_h$—S—, —O—$(CH_2)_h$—O—,

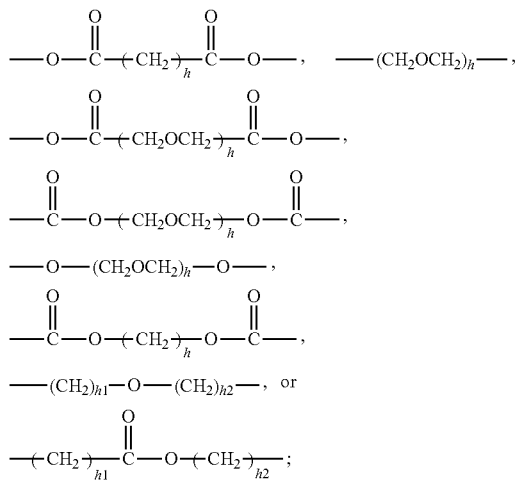

h is a natural number of 1 to 10; h1 and h2 are, independently, a natural number selected so that a sum of carbon atoms of an alkylene group of X is 2 to 10; and X1 to X8 are, independently, hydrogen, a halogen, an unsubstituted or substituted alkyl group, an unsubstituted or substituted aryl group, or an unsubstituted or substituted heteroaryl group.

18. The liquid crystal display of claim 17, wherein the copolymer comprises a compound represented by Chemical Formula 11:

Chemical Formula 11

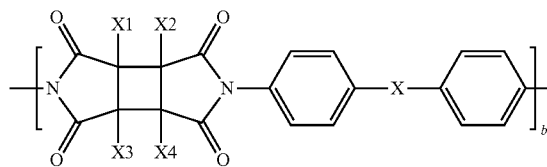

where X is —$(CH_2)_h$—, —S—$(CH_2)_h$—S—, —O—$(CH_2)_h$—O—,

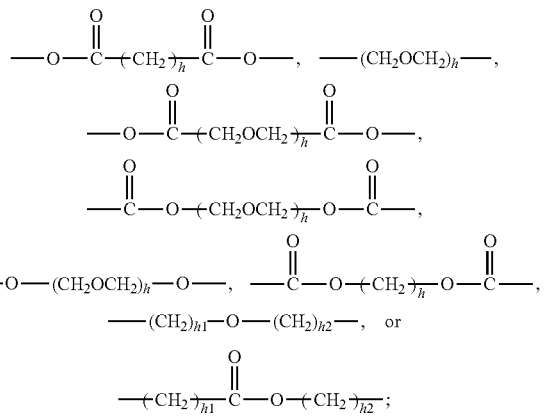

h is a natural number of 1 to 10; h1 and h2 are, independently, a natural number selected so that a sum of carbon atoms of an alkylene group of X is 2 to 10, a:b is 20:80 to 50:50; and X1 to X8 are, independently, hydrogen, a halogen, an unsubstituted or substituted alkyl group, an unsubstituted or substituted aryl group, or an unsubstituted or substituted heteroaryl group.

19. The liquid crystal display of claim 10, further comprising a second electrode disposed on the first substrate; and an insulating layer interposed between the first electrode and the second electrode.

20. The liquid crystal display of claim 19, wherein the first electrode comprises a plurality of branch electrodes, and the second electrode has a planar shape.

21. The liquid crystal display of claim 20, wherein the plurality of branch electrodes overlap the planar-shaped second electrode when viewed from a direction perpendicular to a top surface of the first substrate.

22. The liquid crystal display of claim 19, further comprising a passivation layer disposed between the thin film transistor and the second electrode, wherein the thin film transistor and the first electrode are connected with each other through a contact hole that penetrates the passivation layer and the insulating layer.

23. The liquid crystal display of claim 19, further comprising:

a second substrate facing the first substrate;

a second alignment layer disposed on the second substrate; and a liquid crystal layer disposed between the first substrate and the second substrate and comprising liquid crystal molecules, wherein the second alignment layer is formed of the same material as the first alignment layer.

* * * * *